(12) United States Patent
Crawford

(10) Patent No.: US 10,436,157 B2
(45) Date of Patent: Oct. 8, 2019

(54) APPARATUS FOR IMPROVING ENGINE PERFORMANCE

(71) Applicant: Quirt Evan Crawford, Vista, CA (US)

(72) Inventor: Quirt Evan Crawford, Vista, CA (US)

(*) Notice: Subject to any disclaimer, the term of this patent is extended or adjusted under 35 U.S.C. 154(b) by 0 days.

(21) Appl. No.: 15/808,857

(22) Filed: Nov. 9, 2017

(65) Prior Publication Data

US 2019/0136779 A1    May 9, 2019

(51) Int. Cl.
| | | |
|---|---|---|
| *F02D 41/14* | (2006.01) | |
| *F02M 35/10* | (2006.01) | |
| *F02D 41/30* | (2006.01) | |
| *G01D 5/14* | (2006.01) | |
| *G01F 25/00* | (2006.01) | |
| *G01L 27/00* | (2006.01) | |
| *G01D 5/244* | (2006.01) | |
| *G01F 1/698* | (2006.01) | |
| *F02D 41/00* | (2006.01) | |
| *F02D 41/18* | (2006.01) | |
| *G01F 1/696* | (2006.01) | |

(52) U.S. Cl.
CPC ... *F02M 35/10386* (2013.01); *F02D 41/0002* (2013.01); *F02D 41/1401* (2013.01); *F02D 41/1454* (2013.01); *F02D 41/18* (2013.01); *F02D 41/182* (2013.01); *F02D 41/3005* (2013.01); *F02M 35/1038* (2013.01); *G01D 5/14* (2013.01); *G01D 5/24452* (2013.01); *G01F 1/698* (2013.01); *G01F 1/6965* (2013.01); *G01F 25/0084* (2013.01); *G01L 27/005* (2013.01)

(58) Field of Classification Search
CPC .......... F02M 35/10386; F02D 41/0002; F02D 41/18; F02D 41/182; G01F 1/6965; G01F 1/698; G01D 5/14
USPC ........................................................ 701/103
See application file for complete search history.

(56) References Cited

U.S. PATENT DOCUMENTS

| | | | | |
|---|---|---|---|---|
| 4,550,701 A | | 11/1985 | Suzuki et al. | |
| 4,807,151 A | * | 2/1989 | Citron | G01F 1/6965 123/494 |
| 5,167,152 A | * | 12/1992 | Shimizu | F02D 41/187 73/114.34 |
| 5,432,701 A | * | 7/1995 | Mayer | B60G 17/0195 123/478 |

(Continued)

FOREIGN PATENT DOCUMENTS

WO    WO 2017/093706 A1    6/2017

*Primary Examiner* — Mahmoud Gimie

(57) ABSTRACT

An apparatus for in-line re-calibration of engine load signal, the apparatus having a housing and a first connector disposed on the housing, adapted to plug into an electrical connection socket of an automotive air intake sensor. A second connector is disposed on the housing, adapted to mimic the electrical connection socket of the automotive air intake sensor. An electronic circuit is disposed in the housing, the electronic circuit adapted to re-calibrate signals from the automotive air intake sensor and deliver the re-calibrated signals the to the second connector. The housing is adapted to plug in-line directly into the electrical connection socket of the automotive air intake sensor, whereby the corresponding electrical wiring connector to an engine control unit plugs directly into the second connector of the housing, completing the inline connection.

9 Claims, 4 Drawing Sheets

(56) References Cited

U.S. PATENT DOCUMENTS

| | | | |
|---|---|---|---|
| 5,646,344 A * | 7/1997 | Konzelmann | F02D 41/045 |
| | | | 73/198 |
| 8,265,858 B2 | 9/2012 | Meyer et al. | |
| 9,541,014 B2 | 1/2017 | Glugla | |
| 9,644,548 B2 | 5/2017 | Wu et al. | |
| 9,689,322 B2 | 6/2017 | Xiao et al. | |
| 9,689,357 B2 | 6/2017 | Crawford | |
| 2002/0048991 A1* | 4/2002 | France | H01R 13/5205 |
| | | | 439/587 |
| 2004/0060550 A1 | 4/2004 | Wu et al. | |
| 2006/0224298 A1* | 10/2006 | Lang | G01F 1/72 |
| | | | 701/114 |
| 2009/0222230 A1* | 9/2009 | Bauerle | F02D 41/042 |
| | | | 702/98 |
| 2010/0174469 A1 | 7/2010 | Vannucci Oliveira et al. | |
| 2014/0278012 A1 | 9/2014 | Xiao et al. | |
| 2015/0020570 A1* | 1/2015 | Wuebbeke | G01F 25/0007 |
| | | | 73/1.16 |
| 2016/0146126 A1 | 5/2016 | Glugla | |

\* cited by examiner

APPARATUS FOR IMPROVING ENGINE PERFORMANCE

CROSS REFERENCE TO RELATED APPLICATIONS

Field of the Invention

The present relates to the field of after-market automotive devices for improving engine performance.

BACKGROUND OF THE INVENTION

Many automobiles contain mass air flow sensors. Mass air flow sensors (MAF) are used to determine the mass flow rate of air entering a fuel-injected internal combustion engine. The data that the mass air flow sensor gathers is processed by the engine control unit (ECU), which then determines the proper air to fuel ratio necessary for the engine to run at its most efficient level for factory settings. Besides mass airflow sensors, a manifold absolute pressure sensors (MAP). In some installations, both a MAF and a MAP have been used.

US Pub. 2010/0174469 A1, Pub. Date: Jul. 8, 2010, to Vannucci Oliveira et al. discloses a SYSTEM FOR RECALCULATING THE AIR/FUEL MIXTURE IN INTERNAL COMBUSTION ENGINE VEHICLES, AND AN ELECTRONIC DEVICE. Oliveira et al. conceives a device with reduced dimensions (40×40×15H) mm; its weight is lower than 50 g. and located next to the ECU of the vehicle. Oliveira et al. teaches away from a device located next to the mass air flow sensor.

U.S. Pat. No. 9,689,322 B2 (Pub. Sep. 18, 2014 as US 2014/0278012 A1) to Xiao et al. discloses a SYSTEM AND METHOD FOR SAMPLING AND PROCESSING MASS AIR FLOW SENSOR DATA. Xiao et al. discloses a controller to determine if all frequency information has been received from the MAF sensor for a full cylinder event. Xiao et al. fails to disclose locating the controller next to the mass air flow sensor. Xiao et al. teaches away in his FIG. 1, failing to show any positioning and arrangement of a controller with respect to an ECU.

While several attempts have been made to address the issue of sensor re-calibration, including modification of the voltage or pulse-width signal to the ECU, they fail to address the needs of the after-market in that location of circuitry is preferred to be in or with the ECU, or is ignored. Accordingly, there is a need to have a device—an inline re-calibrator—whose location of installation and housing are adapted to be: 1) easily identified and 2) rendered to be easily installed and removed, next to the sensor, in the after-market environment.

SUMMARY OF THE INVENTION

According to one example of the invention, an in-line re-calibrator is disclosed, the re-calibrator comprising a housing, a first connector disposed on the housing, adapted to plug into an electrical connection socket of an automotive air intake sensor, a second connector disposed on the housing, adapted to mimic the electrical connection socket of the automotive air intake sensor, an electronic circuit disposed in the housing, the electronic circuit adapted to re-calibrate signals from the automotive air intake sensor and deliver the re-calibrated signals the to the second connector, wherein the housing is adapted to plug in-line directly into the electrical connection socket of the automotive air intake sensor, whereby a corresponding electrical wiring connector to an engine control unit plugs directly into the second connector of the housing.

In one example, the electronic circuit generates re-calibrated signals in the same signal character as a signal character of the signals from the automotive air intake sensor. In one example, the signal character is analog voltage. In one example, the signal character is pulse-width modulation.

In one example, the electronic circuit is adapted to apply pre-engineered rules to re-calibrate the signals from the automotive air intake sensor. In one example, the re-calibrated signals are based on pre-engineered rules based on engine dynamometer calculations. In one example, the re-calibrated signals are engineered to change the load signal going to the engine control unit based on a selected engine type.

In one example, the air intake sensor is a mass airflow sensor.

In one example, the air intake sensor is a manifold absolute pressure sensor.

BRIEF DESCRIPTION OF THE DRAWINGS

The present invention will be better understood by referring to the following detailed description of preferred embodiments and the drawings referenced therein, in which.

DETAILED DESCRIPTION OF THE INVENTION

The inventor has identified a new way to perform re-calibration of load tables of the engine control unit. There is a long-felt need to be able to selectively re-calibrate the load tables of an engine control unit, without necessarily replacing the engine control unit and without necessarily replacing the mass airflow sensor or the manifold absolute pressure sensor. The inventor has found the need for an easy and fast way to adapt the load tables for particular use and load scenarios, using particular engines. The inventor has discovered that it would be advantageous to have a separate re-calibration module that can be easily installed, in order to adapt the vehicle to particular duty applications. In particular, there is a need to adapt vehicles to use less fuel and/or optimize the air fuel ration for a more efficient combustion burn. Further, the inventor sees a need for a housing that is adapted to meet the requirements imposed by the automotive after-market, namely that the after-market device be readily installable and location of installation readily identifiable and readily accessible. The inventor has discovered a wide range of uses in identifying and solving this problem, as a separate re-calibration module allows ease in fast re-configuration of vehicles for different duties and also for fast return of the vehicle and load tables to their original configuration.

The inventor has achieved this goal by discovering and developing an inline re-calibrator. In one example, the re-calibrator is attached between the electrical line from the electronic control unit (ECU) and the MAP or MAF. In one example, the in-line re-calibrator detects the voltage of the signal from the MAP or MAF and presents a modified voltage of the signal to the electrical line that goes to the ECU. In one example, the in-line re-calibrator detects the Pulse Width Modulation signal from the MAP or MAF and presents a modified PWM signal to the electrical line that goes to the ECU. The in-line re-calibrator is pre-engineered to contain the desired modifications to the voltage (or PWM) signal, based on the model of engine. In one example, the in-line calibrator is pre-engineered to contain the desired modifications to the voltage (or PWM) signal, based on the anticipated duty of the vehicle and the model of engine.

By modifying the voltage (or PWM) signal, in-line, the load tables within the engine control unit are effectively re-calibrated. In one example, the pre-engineered recalibration disposed in the in-line re-calibrator is based on engine dynamometer calculations. In one example, the pre-engineered recalibration is based on optimizing air fuel ration for more efficient combustion burn, based on engine dynamometer calculations.

Figure 1:
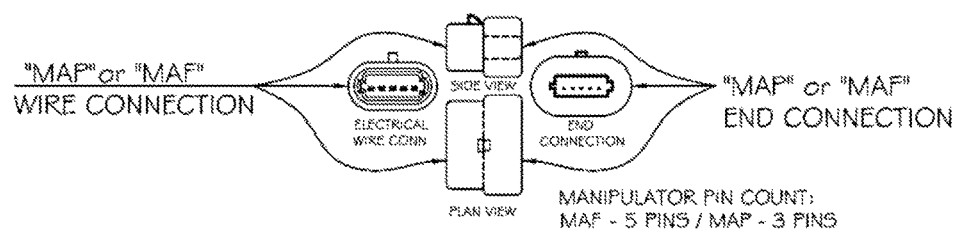
FIG. 1 is diagrammatic view of plan, side, and end views of the in-line re-calibrator.

FIG. 1 is diagrammatic view of plan, side, and end views of the in-line re-calibrator. The right end shows a typical connector adapted to fit into the socket of a MAP, in one example, or into the socket of a MAF, in another example. The left end shows a second connector that is adapted to mimic the socket of the MAP, in one example, or into the socket of the MAF, in another example. The connectors are designed to make physical and electrical connection. For example, a MAF has an electrical pin count of five (5). For example, a MAP has an electrical pin count of three (3). The side view shows the housing shaped to be attachable directly into the socket of the automotive air intake sensor while also shaped to mimic the socket of the automotive air intake sensor, so that a wiring harness that would plug into the air intake sensor instead plugs directly into the in-line re-calibrator.

Figure 2:
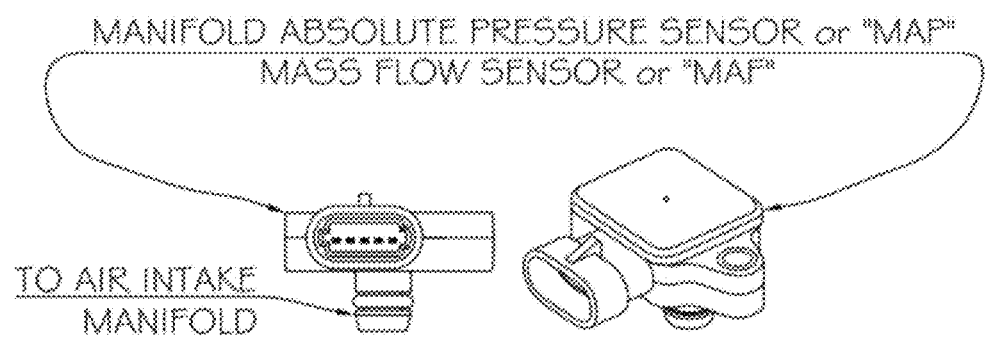
FIG. 2 is a diagrammatic 3-D view of an automotive air intake sensor.

FIG. 2 is a diagrammatic 3-D view of an automotive air intake sensor. In one example, the automotive air intake sensor is a MAP. In another example, the automotive air intake sensor is a MAF. FIG. 2 illustrates the air intake port to the manifold and also illustrates an example of the electrical/physical socket connection on the MAP/MAF (in this example, as illustrated, a five pin MAF connection).

Figure 3:
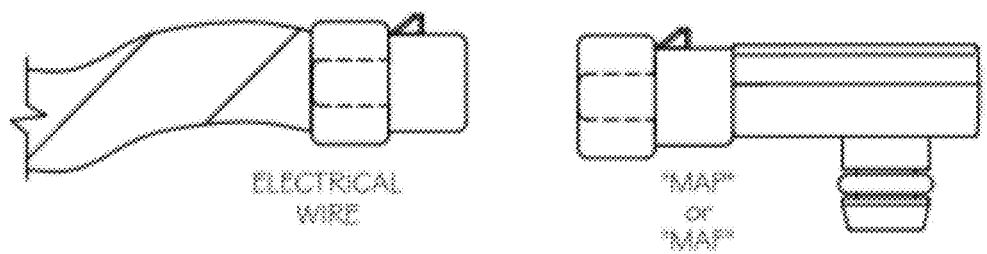
FIG. 3 is a diagrammatic side view showing a typical connection assembly, prior to installation of the in-line re-calibrator.

FIG. 3 is a diagrammatic side view showing a typical connection assembly, prior to installation of the in-line re-calibrator. An electrical wire has a physical and electrical connector that is adapted to fit and connect into the socket connector of the automotive air intake sensor.

Figure 4:
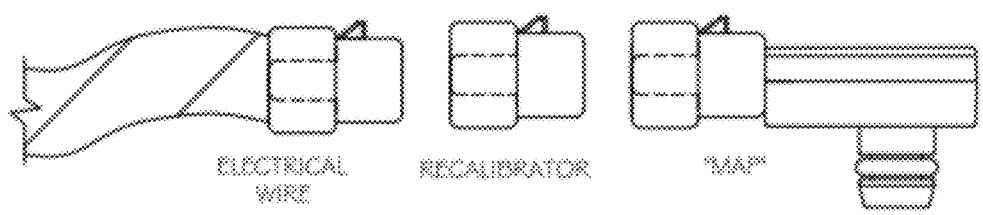
FIG. 4 is a diagrammatic side view showing a modified connection assembly, just prior to installation of the in-line re-calibrator.

FIG. 4 is a diagrammatic side view showing a modified connection assembly, just prior to installation of the in-line re-calibrator. The electrical wire has a physical and electrical connector that is adapted to fit and connect into the socket connector of the automotive air intake sensor. An in-line re-calibrator intercepts between the electrical wire and the automotive air intake sensor. One end of the in-line re-calibrator has a connection or socket that matches or otherwise mimics the connection or socket of the automotive air intake sensor. Another end of the in-line re-calibrator (in this example, the opposite end, for ease in disposing the re-calibrator in-line) mimics the connector of the electrical wire or otherwise is adapted and shaped to physically and electrically connect to the automotive air intake sensor.

Thus, in one example, the device will recalibrate the load tables within the engine control unit to reduce the amount of fuel injected into the engine, thereby changing the air to fuel ration and in so doing optimizing the air fuel ratio for a more efficient combustion burn based on our engine dynamometer calculations. This recalibration is achieved by changing the load signal going to the engine control unit for each engine type. The engine will function more efficiently with the invention installed. The recalibration unit changes the "load" value within the computer by recalibrating the voltage in the signal line to the computer via the adjustment made by the invention.

In may be appreciated that in some examples an automotive air intake sensor is designed to outputs an analog 0.0-5.0 volt signal. Three wires are used: one for ground, one for a five-volt (5v) reference from the ECU, and one for a return signal (zero to five volts) from the air intake sensor. For example, a MAP sensor may provide a 1 to 2-volt signal at an engine idle, rising to 4.5 to 5 volts at wide-open throttle. Roughly, five inches of mercury change in vacuum would be presented as a 0.7 to 1.0 volt change in signal. Intercepting and changing the signal voltage to the ECU will control the decisions made by the ECU.

In some examples, an automotive air intake sensor is designed to output a pulse-width modulation (PWM) signal, for instance, that is proportional to the air mass flow rate. In one example, a five volt square wave is transmitted as the signal. The width of the "squares" of the square-wave carry the information. At engine idle, for example, the vacuum is near maximum and the square waves will have a frequency of about 100 Hertz. At full throttle, the square waves will have a frequency of about 150 Hertz, in this example. Intercepting and changing the frequency of the square waves to the ECU will control the decisions made by the ECU.

While preferred embodiments of the present disclosure have been described, it should be understood that other various changes, adaptations and modifications can be made therein without departing from the spirit of the invention(s) and the scope of the appended claims. The scope of the present disclosure should, therefore, be determined not with reference to the above description, but instead should be determined with reference to the appended claims along with their full scope of equivalents. Furthermore, it should be understood that the appended claims do not necessarily comprise the broadest scope of the invention(s) that the applicant is entitled to claim, or the only manner(s) in which the invention(s) may be claimed, or that all recited features are necessary.

I claim:

1. An in-line re-calibrator module for after-market installation on an automotive air intake sensor producing calibration signals of a vehicle and configured to provide re-calibrated signals to an engine control unit, comprising:
   a housing, shaped for after-market installation on an automotive air intake sensor, the housing separable from the automotive air intake sensor, whereby the vehicle is easily and quickly re-configured for a selected duty or easily and quickly returned to the original configuration provided by the automotive air intake sensor,
   a first connector disposed on the housing, adapted to plug into an electrical connection socket of the automotive air intake sensor,
   a second connector disposed on the housing, adapted to mimic the electrical connection socket of the automotive air intake sensor,
   an electronic circuit disposed in the housing, the electronic circuit adapted to re-calibrate the calibration signals from the automotive air intake sensor and deliver the re-calibrated signals the to the second connector, and wherein the housing is adapted to plug in-line directly into the electrical connection socket of the automotive air intake sensor, whereby a corresponding electrical wiring connector to an engine control unit plugs directly into the second connector of the housing, and wherein the electronic circuit is adapted to re-calibrate the calibration signals from the automotive air intake sensor based on a selected engine type and a selected duty application of the vehicle.

2. The re-calibrator of claim 1 wherein the air intake sensor is a mass airflow sensor.

3. The re-calibrator of claim 1 wherein the air intake sensor is a manifold absolute pressure sensor.

4. The re-calibrator of claim 1 wherein the electronic circuit generates re-calibrated signals in the same signal character as a signal character of the signals from the automotive air intake sensor.

5. The re-calibrator of claim 4 wherein the signal character is analog voltage.

6. The re-calibrator of claim 4 wherein the signal character is pulse-width modulation.

7. The re-calibrator of claim 1 wherein the electronic circuit is adapted to apply pre-engineered rules to re-calibrate the signals from the automotive air intake sensor.

8. The re-calibrator of claim 1 wherein the re-calibrated signals are based on pre-engineered rules based on engine dynamometer calculations.

9. The re-calibrator of claim 1 wherein the electronic circuit is adapted to re-calibrate the calibration signals from the automotive air intake sensor is further based on a load table of the engine control unit.

* * * * *